US011700534B2

(12) United States Patent
Nilsson et al.

(10) Patent No.: US 11,700,534 B2
(45) Date of Patent: Jul. 11, 2023

(54) FREQUENCY MULTIPLEXING OF FIRST AND SECOND OFDMA TRANSMISSIONS

(71) Applicant: Telefonaktiebolaget LM Ericsson (publ), Stockholm (SE)

(72) Inventors: Thomas Nilsson, Malmo (SE); Dennis Sundman, Sollentuna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 351 days.

(21) Appl. No.: 16/766,831

(22) PCT Filed: Dec. 4, 2017

(86) PCT No.: PCT/SE2017/051205
§ 371 (c)(1),
(2) Date: May 26, 2020

(87) PCT Pub. No.: WO2019/112493
PCT Pub. Date: Jun. 13, 2019

(65) Prior Publication Data
US 2021/0022004 A1   Jan. 21, 2021

(51) Int. Cl.
*H04L 12/28* (2006.01)
*H04W 16/14* (2009.01)
(Continued)

(52) U.S. Cl.
CPC ........... *H04W 16/14* (2013.01); *H04L 5/0007* (2013.01); *H04W 72/0453* (2013.01); *H04W 74/0891* (2013.01)

(58) Field of Classification Search
CPC .... H04L 5/0007; H04W 16/14; H04W 16/16; H04W 28/20; H04W 52/0216;
(Continued)

(56) References Cited

U.S. PATENT DOCUMENTS

2014/0044105 A1   2/2014   Bontu et al.
2015/0181589 A1*  6/2015   Luo ..................... H04L 5/0032
                                                      370/329
(Continued)

FOREIGN PATENT DOCUMENTS

CN   105611541 A    5/2016
KR   20160138645 A  12/2016
WO   2014028440 A1  2/2017

OTHER PUBLICATIONS

PCT International Search Report, dated Oct. 16, 2018, in connection with International Application No. PCT/SE2017/051205, all pages.
(Continued)

*Primary Examiner* — John Pezzlo
(74) *Attorney, Agent, or Firm* — Leffler Intellectual Property Law, PLLC

(57) ABSTRACT

A wireless communications system and a method for frequency multiplexing a first (LAA) OFDMA transmission and a second (Wi-Fi) OFDMA transmission on a shared radio channel spanning at least partly a common bandwidth. The system determines an unallocated frequency band available beside a first frequency band intended for a first transmission and sends a sharing request comprising information about the unallocated band. The system decides to use the unallocated band in a second frequency band in the shared channel. The system sends a legacy preamble and a first part of a Wi-Fi preamble spanning the shared channel. The first transmission is sent in the first band such that an end time point of the first part of the Wi-Fi preamble coincides with a start time point of the first transmission. Further, the system sends a second part of the Wi-Fi preamble and the second transmission in the second band.

41 Claims, 8 Drawing Sheets

(51) Int. Cl.
*H04L 5/00* (2006.01)
*H04W 72/0453* (2023.01)
*H04W 74/08* (2009.01)
*H04J 1/16* (2006.01)

(58) Field of Classification Search
CPC ......... H04W 52/0219; H04W 52/0235; H04W 72/12; H04W 72/085; H04W 72/0406; H04W 72/0453; H04W 74/08; H04W 74/0891; H04W 84/12
USPC ........................................ 370/252, 329, 430
See application file for complete search history.

(56) References Cited

U.S. PATENT DOCUMENTS

| | | | |
|---|---|---|---|
| 2015/0223244 A1 | 8/2015 | Tabet et al. | |
| 2016/0044516 A1 | 2/2016 | Hedayat et al. | |
| 2016/0192395 A1* | 6/2016 | Yoo | H04B 7/0874 370/329 |
| 2016/0262188 A1* | 9/2016 | Zhang | H04J 11/0056 |
| 2016/0295420 A1 | 10/2016 | Luo et al. | |
| 2017/0013470 A1* | 1/2017 | Sun | H04W 16/14 |
| 2017/0126346 A1* | 5/2017 | Chendamarai Kannan | H04W 72/0413 |
| 2018/0176787 A1* | 6/2018 | Fakoorian | H04W 28/0205 |
| 2019/0320467 A1* | 10/2019 | Freda | H04W 74/004 |
| 2020/0281022 A1* | 9/2020 | Pelletier | H04W 72/0453 |

OTHER PUBLICATIONS

PCT Written Opinion, dated Oct. 16, 2018, in connection with International Application No. PCT/SE2017/051205, all pages.
H 3GPP TSR RAN WG2 #71, R2-104444, "Analysis in In-Device Coexistence Interference Avoidance", Aug. 23-27, 2010, Madrid, Spain, MediaTek, 10 pages.
European Communication dated Jun. 21, 2021 in connection with European Application No. 17933870.2, 6 pages.
3GPP TSG RAN WG1 Meeting #80, R1-150577, Athens, Greece, Feb. 9-13, 2015, MediaTek Inc., "Discussions on LAA frame structure design and LAA-WIFI Coexistence", 4 pages.
3GPP TSG RAN WG1 Meeting #80, R1-150156, Athens, Greece, Feb. 9-13, 2015, ZTE, "Analysis on potential issues and solutions for LAA UL transmission", 6 pages.

* cited by examiner

FREQUENCY MULTIPLEXING OF FIRST AND SECOND OFDMA TRANSMISSIONS

TECHNICAL FIELD

Embodiments herein relate generally to a wireless communications system, a first network node, a second network node and to methods therein. In particular, embodiments relate to frequency multiplexing of first and second OFDMA transmissions.

BACKGROUND

Communication devices such as terminals are also known as e.g. User Equipments (UEs), mobile terminals, stations (STAs), wireless devices, wireless terminals and/or mobile stations. Terminals are enabled to communicate wirelessly in a wireless communications network, such as a Wireless Local Area Network (WLAN), or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, tablets or sensors with wireless capability, just to mention some further examples. The communications devices in the present context may be, for example, portable, pocket-storable, hand-held, wall-mounted, computer-comprised, or vehicle-mounted mobile devices, enabled to communicate voice and/or data, via the access network, such as a Radio Access Network (RAN), with another entity, such as an Access Point (AP), another communications device or a server.

The cellular communications network covers a geographical area which is divided into cell areas, wherein each cell area being served by an access node such as a base station, e.g. a Radio Base Station (RBS), which sometimes may be referred to as e.g. "eNB", "gNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

The 3GPP work on Licensed-Assisted Access (LAA) intends to allow LTE equipment to also operate in the unlicensed radio spectrum. Supported radio bands for LTE operation in the unlicensed radio spectrum include 5 GHz, 3.5 GHz, etc. The unlicensed spectrum is used as a complement to the licensed radio spectrum or allows completely standalone operation. MulteFire™ is an example of an LTE-based standalone radio access technology that operates purely in unlicensed spectrum. Licensed-assisted and standalone operation in unlicensed spectrum will also be supported by the 5G New Radio (NR) technology. In this disclosure the term LAA device or enhanced LAA (eLAA) device is sometimes used, but it is a non-limiting term and should be interpreted as any device such as a UE or an eNB, operating in an LTE communications network or in an NR based communications network, e.g. a MulteFire™ device or NR-Unlicensed (NR-U) device, operating in the unlicensed radio spectrum.

In a communications network supporting eLAA or MulteFire™ devices, e.g. a UE, uplink communication is scheduled by the eNB. The UE is not allowed to transmit data without being granted resources by the eNB. The eNB allows uplink access at specific time points by transmitting uplink (UL) grants in the downlink to the scheduled UEs.

Regulatory requirements, however, may not permit transmissions in the unlicensed radio spectrum without prior channel sensing, transmission power limitations or imposed maximum channel occupancy time. Since the unlicensed radio spectrum must be shared with other communications network of similar or dissimilar wireless technologies, a so called Listen-Before-Talk (LBT) method needs to be applied. The LBT method involves sensing the communications medium, e.g. a radio channel, for a pre-defined minimum amount of time and backing off if the radio channel is busy. Therefore, the transmission occasions of reference signals used, by the UE, to discover and measure cells cannot be pre-determined or fixed.

One problem with allocating an LAA radio carrier in the unlicensed radio spectrum is the asynchronous behaviour of a traditional LBT scheme. By the asynchronous behaviour of the traditional LBT scheme is meant that access to the radio channel may be permitted at any point in time depending of the LBT outcome. The LTE technology assumes strict subframe timing meaning that the LAA radio carrier cannot be scheduled arbitrary in time. Preferably, the LAA device should try to access the radio channel using the LBT scheme slightly in advance of the possible transmission point. Such an LBT method should work well in a communications network under low load conditions. By the expression "low load conditions" when used in this disclosure is meant that few devices with infrequent data to transmit are competing for access to the radio channel. In 3GPP LTE Release 14 comprising the LAA feature, two possible starting points per subframe are defined. A first starting point is the start point of a first slot and a second starting point is the start point of a second slot. There has been some discussion, mainly from the Wi-Fi companies, whether or not the LAA transmissions should append a Wi-Fi preamble to improve coexistence. Under high traffic load there is an increased risk that the LAA transmission might fail the LBT and consequently fail to transmit at the subframe and/or slot boundary.

The IEEE 802.11ax standard is the latest Wi-Fi technology standard and is currently being standardized by the IEEE 802.11ax Task Group (TGax). Two of the most prominent new features in the IEEE 802.11ax standard are uplink and/or downlink Orthogonal Frequency-Division Multiple Access (OFDMA) and uplink Multiple User Multiple-Input and Multiple-Output (MU-MIMO). In the IEEE 802.11ax standard a tone plan has been set for the new Fast Fourier Transform (FFT) size of 256, which is 4 times more than the FFT size of the legacy IEEE 802.11 standard. The smallest allocated subband is referred to as a Resource Unit (RU) and consists of 26 subcarriers. Each RU contains two pilot tones. Besides the full band, the largest resource unit for 20 MHz contains 106 tones and 4 pilot tones, which corresponds roughly to half of the bandwidth. There are many more tone unit sizes for different bandwidths. This tone plan is required for resource allocation with ODMA in uplink and downlink. To support the new features a new preamble, called High Efficiency (HE) preamble, is appended following the legacy preamble part. Some of the fields in the HE preamble spans the full bandwidth while other fields only spans the allocated RUs. FIG. 7 illustrates the legacy and HE preambles required for a IEEE 802.11ax transmission.

The LAA technology and the MulteFire™ access technology are not designed to allow for very short transmissions like the transmissions allowed according to the Wi-Fi technology. In for example a Wi-Fi communications network, packets may last for only a few OFDM symbols, wherein each OFDM symbol is 4 microseconds long. In the general case, a transmission operation (TXOP) lasts for a number of subframes. The current standard specifications for the LAA/eLAA technology (cf. The 3GPP TS 36.213 V13.5.0) and MulteFire™ access technology allow for so called partial subframes where parts of the OFDM symbols in one subframe are not transmitted. One example is where only the second slot of one subframe is allocated for a UE. However, when subframe n is a partial subframe, e.g. only the second slot is allocated for the UE, then the UE should assume that the transmission continues in subframe n+1 (cf. The 3GPP TS 36.213 V13.5.0). By using partial subframes it is not possible to reduce the duration of the transmission to be less than one subframe, e.g. less than 1 ms.

The eNB tries to allocate as many Resource Blocks (RBs) in the subframe as possible but when there is little data to transmit the allocation might be very small. One way to solve this problem is to suspend the transmissions until more data is available. However, that will increase the delay which is not good for higher layer protocols etc. The allocation of data is different in a Wi-Fi communications network and the transmission length is adapted according to the size of the payload, e.g. of the data.

A transmission from the eNB carrying a very small allocation will still cause the radio channel to be busy for Wi-Fi devices even though most of the radio band is not allocated. One example where lots of radio spectrum is wasted is when small packets frequently must be transmitted with a low latency requirement.

SUMMARY

According to developments of wireless communications systems an improved channel access procedure is needed for improving the performance of the wireless communications system.

Therefore, an object of embodiments herein is to overcome the above-mentioned drawbacks among others and to improve the performance in a wireless communications system.

According to an aspect of embodiments herein, the object is achieved by a method performed in a wireless communications system for frequency multiplexing a first (LAA) Orthogonal Frequency Division Multiple Access (OFDMA) transmission and a second (W-Fi) OFDMA transmission on a shared radio channel spanning at least partly a common bandwidth. A first network node and a first wireless device are operating in a first wireless communications network (LAA), and a second network node and a second wireless device are operating in a second wireless communications network (Wi-Fi).

The system determines an unallocated frequency band available beside a first frequency band intended/allocated for a first (LAA) OFDMA transmission in the shared radio channel, and sends a sharing request comprising information about the unallocated frequency band.

The system decides to use the unallocated band in a second frequency band in the shared radio channel.

Further, the system conducts a contention procedure (LBT), and sends an L (legacy) preamble spanning the shared radio channel.

Furthermore, the system sends a first part of a HE (Wi-Fi) preamble spanning the shared radio channel, and a first (LAA) OFDMA transmission in the first frequency band, such that an end point of time of the first part of the HE (Wi-Fi) preamble coincides with a start point of time of the first OFDMA transmission.

Yet further, the system sends a second part of the HE (Wi-Fi) preamble and the second (Wi-Fi) OFDMA transmission in the second frequency band.

According to another aspect of embodiments herein, the object is achieved by a wireless communications system for frequency multiplexing a first (LAA) Orthogonal Frequency Division Multiple Access (OFDMA) transmission and a second (Wi-Fi) OFDMA transmission on a shared radio channel spanning at least partly a common bandwidth. A first network node and a first wireless device are configured to operate in a first wireless communications network (LAA), and a second network node and a second wireless device are configured to operate in a second wireless communications network (Wi-Fi).

The system is configured to determine an unallocated frequency band available beside a first frequency band intended/allocated for a first (LAA) OFDMA transmission in the shared radio channel, and sends a sharing request comprising information about the unallocated frequency band.

The system is configured to decide to use the unallocated band in a second frequency band in the shared radio channel.

Further, the system is configured to conduct a contention procedure, and to send an L (legacy) preamble spanning the shared radio channel.

Furthermore, the system is configured to send a first part of a HE (Wi-Fi) preamble spanning the shared radio channel, and a first (LAA) OFDMA transmission in the first frequency band, such that an end point of time of the first part of the HE (Wi-Fi) preamble coincides with a start point of time of the first OFDMA transmission.

Yet further, the system is configured to send a second part of the HE (Wi-Fi) preamble and the second (Wi-Fi) OFDMA transmission in the second frequency band.

According to another aspect of embodiments herein, the object is achieved by a method performed by a first network node for frequency multiplexing a first (LAA) OFDMA transmission and a second (Wi-Fi) OFDMA transmission on a shared radio channel spanning at least partly a common bandwidth. The first network node and a first wireless device are operating in a first wireless communications network (LAA), and a second network node and a second wireless device are operating in a second wireless communications network (Wi-Fi).

The first network node determines an unallocated frequency band available beside a first frequency band intended/allocated for a first (LAA) OFDMA transmission in the shared radio channel, and sends, to the second network node, a sharing request comprising information about the unallocated frequency band in a second frequency band in the shared radio channel.

Further, the first network node conducts a contention procedure.

Furthermore, the first network node sends, to the first wireless device, the first (LAA) OFDMA transmission in the first frequency band, such that an end point of time of the first part of the HE (Wi-Fi) preamble coincides with a start point of time of the first OFDMA transmission.

According to another aspect of embodiments herein, the object is achieved by a first network node for frequency multiplexing a first (LAA) OFDMA transmission and a second (Wi-Fi) OFDMA transmission on a shared radio channel spanning at least partly a common bandwidth. The first network node and a first wireless device are configured to operate in a first wireless communications network (LAA), and a second network node and a second wireless device are configured to operate in a second wireless communications network (Wi-Fi).

The first network node is configured to determine an unallocated frequency band available beside a first frequency band intended/allocated for a first (LAA) OFDMA transmission in the shared radio channel, and to send, to the second network node, a sharing request comprising information about the unallocated frequency band in a second frequency band in the shared radio channel.

Further, the first network node is configured to conduct a contention procedure.

Furthermore, the first network node is configured to send, to the first wireless device, the first (LAA) OFDMA transmission in the first frequency band, such that an end point of time of the first part of the HE (Wi-Fi) preamble coincides with a start point of time of the first OFDMA transmission.

According to another aspect of embodiments herein, the object is achieved by a method performed by a second network node for frequency multiplexing a first (LAA) OFDMA transmission and a second (Wi-Fi) OFDMA transmission on a shared radio channel spanning at least partly a common bandwidth. The first network node and a first wireless device are operating in a first wireless communications network (LAA), and the second network node and a second wireless device are operating in a second wireless communications network (Wi-Fi).

The second network node receives, from the first network node, a sharing request comprising information about an unallocated frequency band available beside a first frequency band intended/allocated for a first (LAA) OFDMA transmission in the shared radio channel.

Further, the second network node decides to use the unallocated band in a second frequency band in the shared radio channel and conducts a contention procedure.

Furthermore, the second network node sends, to the second wireless device, a second part of the HE (Wi-Fi) preamble and the second (Wi-Fi) OFDMA transmission in the second frequency band.

According to another aspect of embodiments herein, the object is achieved by a second network node for frequency multiplexing a first (LAA) OFDMA transmission and a second (Wi-Fi) OFDMA transmission on a shared radio channel spanning at least partly a common bandwidth. The first network node and a first wireless device are configured to operate in a first wireless communications network (LAA), and the second network node and a second wireless device are configured to operate in a second wireless communications network (Wi-Fi).

The second network node is configured to receive, from the first network node, a sharing request comprising information about an unallocated frequency band available beside a first frequency band intended/allocated for a first (LAA) OFDMA transmission in the shared radio channel.

Further, the second network node is configured to decide to use the unallocated band in a second frequency band in the shared radio channel and to conduct a contention procedure.

Furthermore, the second network node is configured to send, to the second wireless device, a second part of the HE (Wi-Fi) preamble and the second (Wi-Fi) OFDMA transmission in the second frequency band.

According to another aspect of embodiments herein, the object is achieved by a computer program, comprising instructions which, when executed on at least one processor, causes the at least one processor to carry out the method performed by the wireless communications system.

According to another aspect of embodiments herein, the object is achieved by a computer program, comprising instructions which, when executed on at least one processor, causes the at least one processor to carry out the method performed by the first network node.

According to another aspect of embodiments herein, the object is achieved by a computer program, comprising instructions which, when executed on at least one processor, causes the at least one processor to carry out the method performed by the second network node.

According to another aspect of embodiments herein, the object is achieved by a carrier comprising the computer program, wherein the carrier is one of an electronic signal, an optical signal, a radio signal or a computer readable storage medium.

Since the system sends the L (legacy) preamble and the first part of the HE (Wi-Fi) preamble spanning the shared radio channel, and the first (LAA) OFDMA transmission in the first frequency band, such that an end point of time of the first part of the HE (Wi-Fi) preamble coincides with a start point of time of the first OFDMA transmission, and since the system sends the second part of the HE (Wi-Fi) preamble and the second (Wi-Fi) OFDMA transmission in the second frequency band, some of the unallocated spectrum in an LAA signal is used to transmit Wi-Fi OFDMA allocated data. Therefore, a more efficient use of the unlicensed frequency band is provided. This results in an improved performance in the wireless communications system.

An advantage with embodiments herein is that the latency in the wireless communications system is reduced.

A further advantage with embodiments herein is that an heterogeneous OFDMA coexistence is provided, whereby the radio spectrum is utilized more efficiently in for example scenarios where the first network node, such as the eNB, only have data to allocate a small part of the radio spectrum.

A yet further advantage with embodiments herein is that a more efficient use of the unlicensed band is provided in case of unequal traffic loads in the first and second communications networks.

BRIEF DESCRIPTION OF DRAWINGS

Examples of embodiments herein will be described in more detail with reference to attached drawings in which.

DETAILED DESCRIPTION

An object addressed by embodiments herein is how to improve performance in a wireless communications system.

Therefore, as mentioned above, according to embodiments herein, a way of improving the performance in the wireless communications system is provided.

Some embodiments herein relate to a heterogeneous OFDMA approach to utilize the radio spectrum more efficiently in scenarios where the eNB only have data to allocate on a small part of the radio spectrum. A scenario wherein the eNB is collocated with a W-Fi AP that supports the new IEEE amendment 802.11ax may be considered. However, the eNB and the AP do not need to be collocated and embodiments disclosed herein may be used in most scenarios but the signalling and coordination is simplified in a collocated scenario.

According to some embodiments disclosed herein, a part of an unallocated radio spectrum in an LAA signal is used to transmit W-Fi OFDMA allocated data using the new IEEE 802.11ax amendment. However, an LTE communications network and an IEEE 802.11ax communications network have very different OFDM parameters, i.e. different symbols duration and different cyclic prefix length, and therefore an optional guard band between the allocated W-Fi subcarriers and the allocated LAA subcarriers in the OFDMA transmission may be needed. The size of the optional guard band may depend on factors like filters in the LAA device. A good choice may be to have the size of one RU in the IEEE 802.11ax as a guard band, e.g. approximately 2 MHz.

Figure 7:
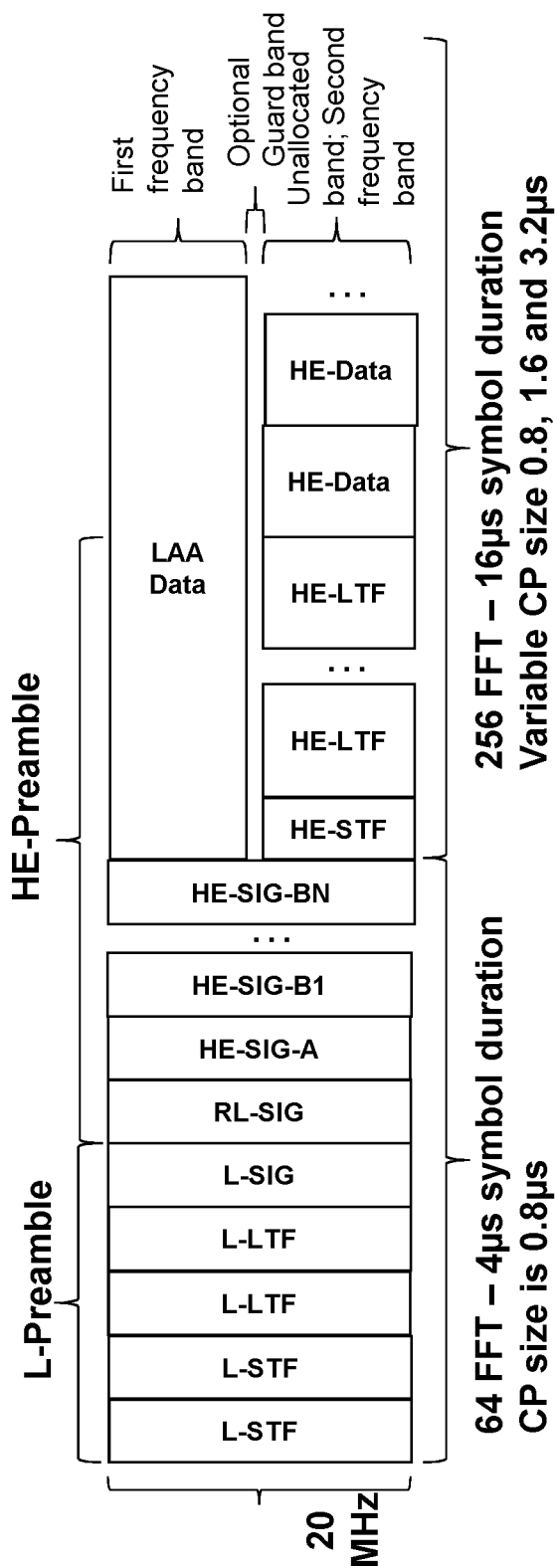
FIG. 7 is a schematic diagram illustrating embodiments of an L-preamble (legacy) and a HE-preamble.
Figure 8:
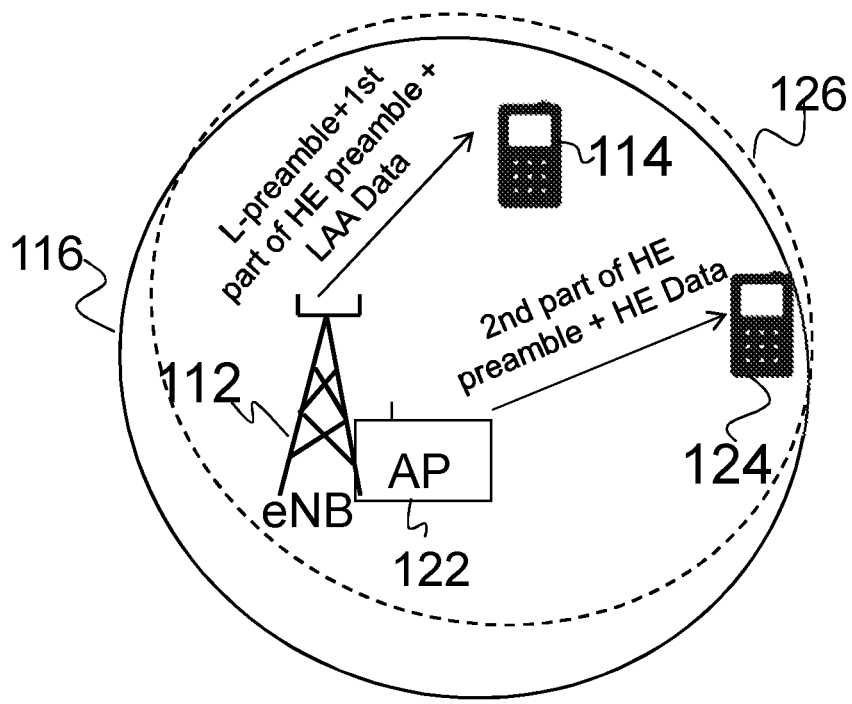
FIG. 8 is a schematic block diagram illustrating embodiments of a wireless communications system wherein a first and a second network node are collocated.

In some first embodiments, schematically illustrated in FIG. 8, wherein the eNB and AP are collocated, the eNB signals the AP the size of the unallocated band in the next LAA transmission. The AP makes the decision if the unallocated size may be used for an IEEE.802.11ax OFDMA transmission, sometimes referred to as a W-Fi OFDMA transmission herein. This decision is signalled back to the eNB. The eNB performs the LBT and tries to get access prior to the subframe boundary. If the eNB is successful in acquiring the channel, then a legacy IEEE 802.11 preamble and parts of the HE-preamble that spans the full bandwidth, see FIG. 7 is transmitted first followed by the LAA OFDMA transmission. The AP will detect the legacy preamble and start transmitting the HE-preamble, including the OFDMA allocated subcarriers, directly following the end of the legacy preamble transmitted by the eNB.

Figure 9:
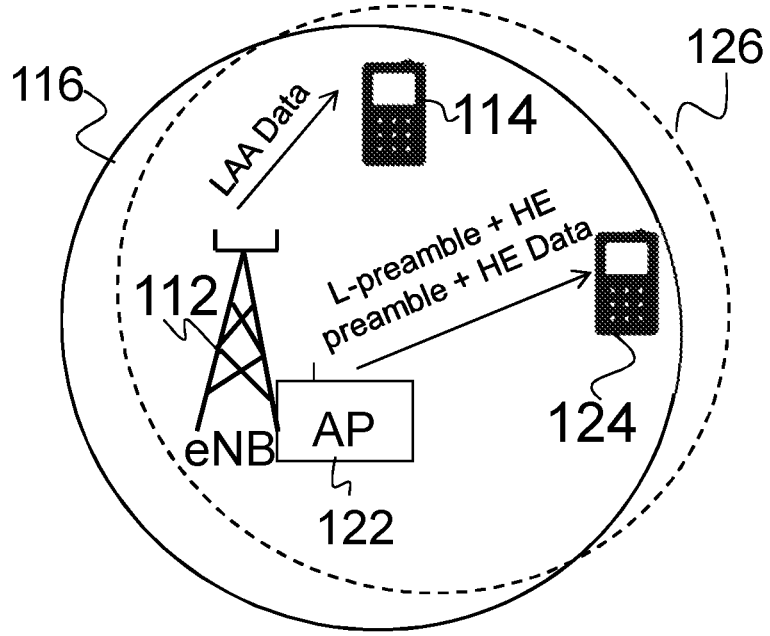
FIG. 9 is a schematic block diagram illustrating embodiments of a wireless communications system wherein a first and a second network node are collocated.

In some second embodiments, schematically illustrated in FIG. 9, wherein the eNB and AP are collocated, the AP transmits the legacy preamble but this may require strict synchronization with the eNB to align the transmissions to the subframe boundary.

Figure 10:
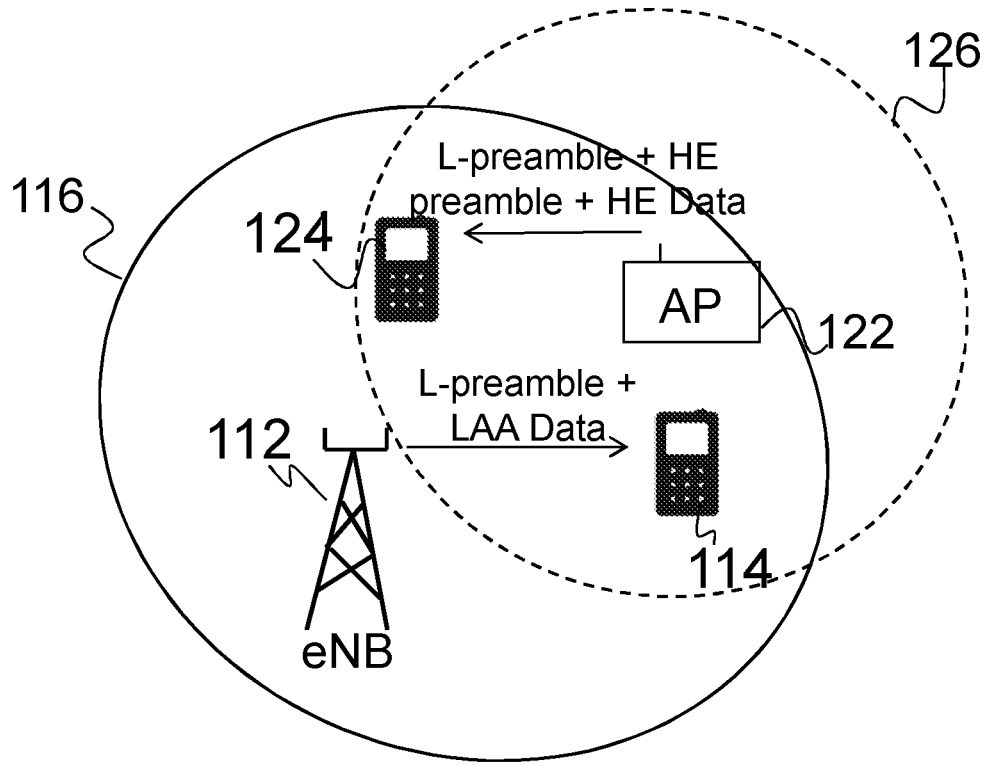
FIG. 10 is a schematic block diagram illustrating embodiments of a wireless communications system wherein a first and a second network node are non-collocated.

In some third embodiments, schematically illustrated in FIG. 10, wherein the eNB and AP are not collocated but still within range of one another's Clear Channel Assessment (CCA) threshold, the same signalling may be required as in some first embodiments. However, the AP may need to be synchronized to the subframe boundary of the eNB. Both the AP and eNB may need to perform LBT and try to access the channel in time to transmit the legacy preamble. The legacy preamble should be transmitted by the eNB and AP to signal a busy channel (physical and virtual carrier sensing). They might have different contending devices, LAA or as neighbouring devices. Following the legacy preamble transmission, they will perform the same transmissions as in some first embodiment.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 1:
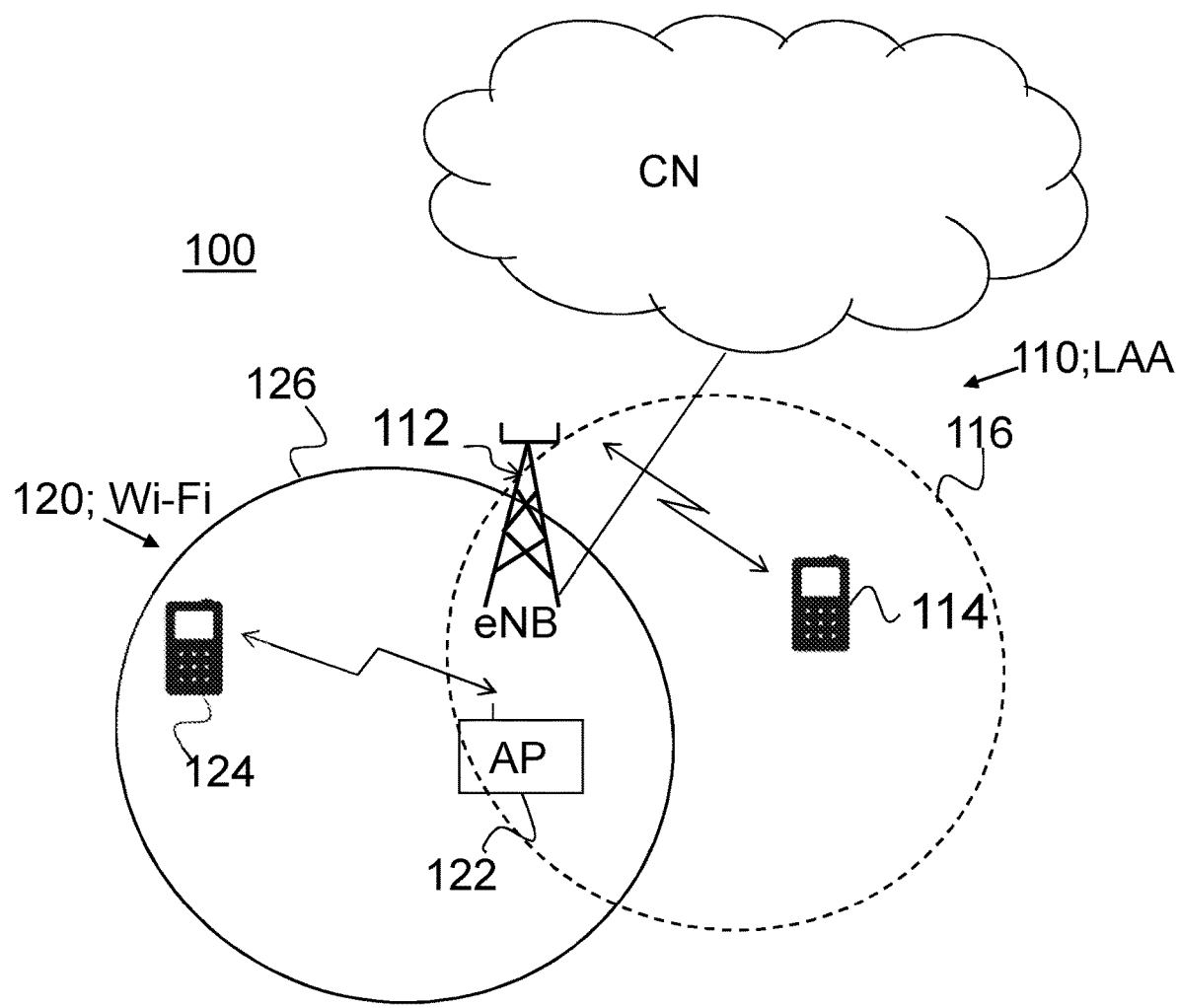
FIG. 1 is a schematic block diagram illustrating embodiments of a wireless communications system.

FIG. 1 depicts an example of a wireless communications system 100 according to embodiments disclosed herein. The wireless communications system 100 may comprise one or more wireless communications networks, e.g. a first and a second wireless communications network, which will be described in more detail below. The wireless communications system 110 may be a contention based communications system that deploy some kind of listen-before-talk procedure to get access to a radio channel, e.g. before allowing transmission using the radio channel. The wireless communications system 100 may comprise a cellular communications network such as a New Radio (NR) network, a 5G network, an LTE network, a MulteFire communications network, a Licensed-Assisted Access (LAA) network, an enhanced LAA network, a Wideband Code Division Multiple Access (WCDMA) network, a Global System for Mobile Communications (GSM), any 3GPP cellular network, or a short range communications network, such as a Wireless Local Area Network (WLAN) e.g. a Wi-Fi network, an Low Rate Wireless Personal Access Network (LR-WPAN), a Bluetooth network, WiMAX network, a SIGFOX network, a Zigbee network, a Bluetooth Low Energy (BLE) network such as a Bluetooth Smart network, or a Cellular Internet of Things (CIoT) network such as an Extended Coverage GSM-IoT (EC-GSM-IoT) network, a Narrow Band (NB) IoT network or a Machine Type Communications (MTC) network, or a combination of one or more of the aforementioned communications networks just to mention some examples.

A first wireless communications network 110 operates in the wireless communications system 100. The first wireless communications network 110 may be a cellular communications network providing LAA. For example, the first wireless communications network 110 may be a NR network, a NR-U network, a MulteFire network, a 5G network, an LTE network, a WCDMA network, a GSM network, any 3GPP cellular network, a cellular IoT network, or a combination of one or more of the aforementioned communications networks just to mention some examples.

In this disclosure, the first wireless communications network 110 is sometimes referred to as an LAA network.

A first network node 112 is configured to operate in the communications network 110. The first network node 112 may be a base station supporting LAA. For example, the first network node 112 may be a wireless access node, such as a radio access node. The radio access node may be a radio base station, for example a gNB, an eNB, i.e. an eNodeB, or a Home Node B or any other network node capable to serve and/or communicate with a first wireless device 114 operating within a first coverage area 116 of the first network node 112.

The first wireless device 114 may be a mobile station, a user equipment (UE) and/or a wireless terminal. It should be understood by the skilled in the art that "wireless device" is a non-limiting term which means any terminal, communications device, wireless communication terminal, user equipment, MTC device, Device-to-Device (D2D) terminal, or node e.g. smart phone, laptop, mobile phone, sensor, relay, mobile tablets, IoT device, e.g. a Cellular IoT device or even a small base station communicating within a service area, e.g. within the coverage area 116.

In this disclosure the terms communications device, terminal, wireless device and UE are used interchangeably. Please note the term user equipment used in this document also covers other wireless devices such as Machine-to-Machine (M2M) devices, even though they do not have any user.

A second wireless communications network 120 operates in the wireless communications system 100. The second wireless communications network 120 may be a short range communications network, such as a WLAN e.g. a Wi-Fi network, an LR-WPAN, a Bluetooth network, WiMAX network, a SIGFOX network, a Zigbee network, a BLE network such as a Bluetooth Smart network, a Narrow Band (NB) IoT network or a MTC network.

In this disclosure, the second wireless communications network 120 is sometimes referred to as a Wi-Fi network.

A second network node 122 is configured to operate in the second communications network 120. The second network node 122 may be an Access Point (AP) supporting access according to the IEEE 802.11ax standard. For example, the second network node 122 may be a wireless access node, such as a WLAN Access Point (AP) e.g. a Wi-Fi AP. The second network node 122 is configured to serve and/or communicate with a second wireless device 124 operating within a second coverage area 126 of the second network node 122.

The second wireless device 124 is configured to operate in the second wireless communications network 120. The second wireless device 124 may be any wireless device, such as a station (STA), an Internet of Things (IoT) device, a Long Range Low Power (LRLP) device such as a sensor, or a user equipment, just to give some examples. In some embodiments the non-limiting term user equipment (UE) is used and it refers to any type of wireless device communicating with a network node in a communications network. Examples of wireless devices are stations (STAs), target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms communications device, wireless device and UE are used interchangeably. Please note the term user equipment used in this document also covers other wireless devices such as M2M devices, even though they do not have any user.

The first and second coverage areas 116,126 may be determined as the areas where communication between the first network node 112 and the first wireless device 114, and the second network node 122 and the second wireless device 124, respectively, are possible, given one or more constraints on, e.g., output power, required data rate and similar. In this disclosure, the coverage areas 116,126 are sometimes also referred to as serving areas, cells or clusters.

Figure 2:
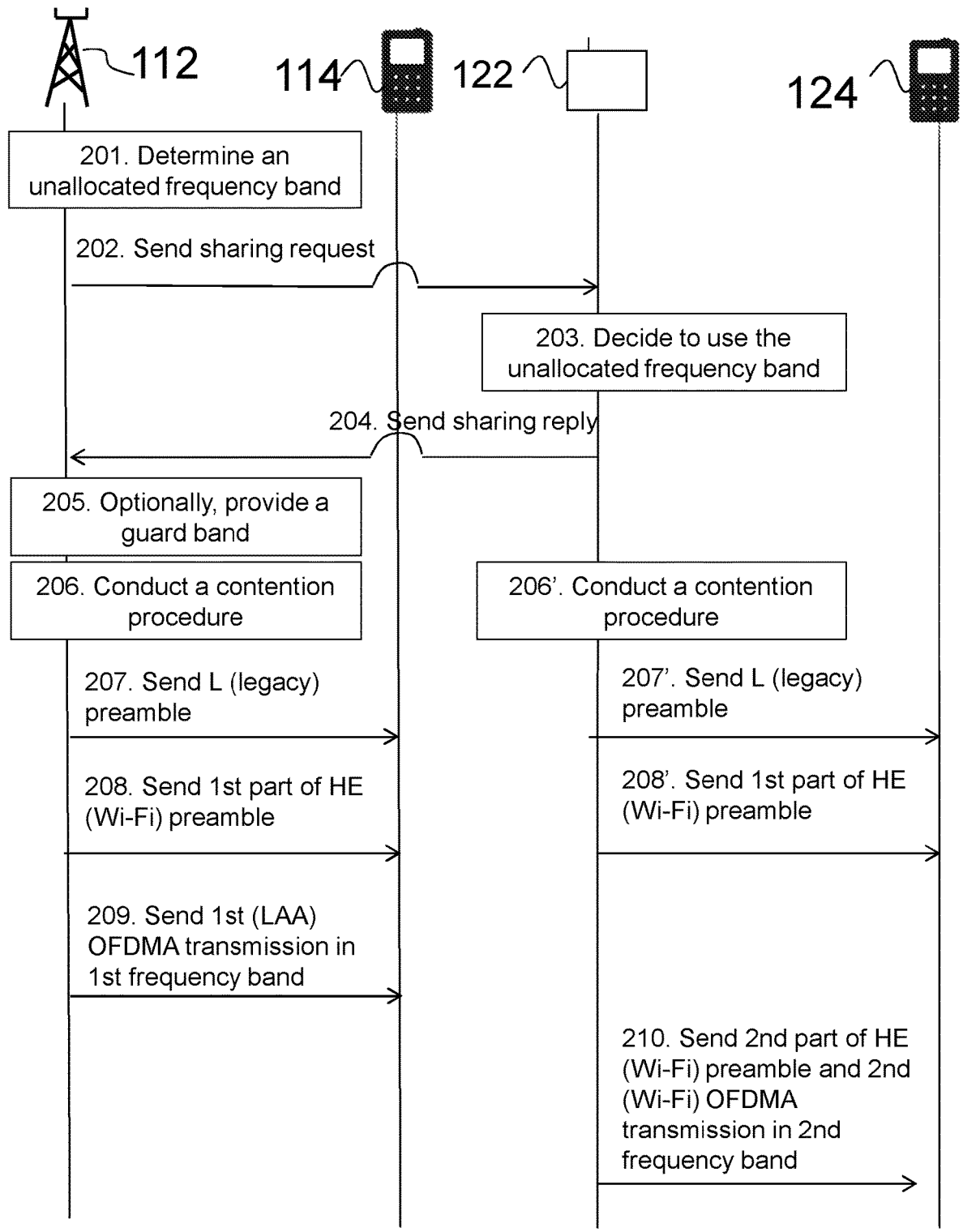
FIG. 2 is a combined flowchart and signalling scheme schematically illustrating embodiments of a method performed in a wireless communications system.

FIG. 2 is a schematic combined flowchart and signalling scheme of embodiments of a method performed in the wireless communications system 100 for frequency multiplexing a first (LAA) OFDMA transmission and a second (Wi-Fi) OFDMA transmission on a shared radio channel spanning at least partly a common bandwidth. As previously mentioned, the first network node eNB; 112 and the first wireless device 114 are operating in the first wireless communications network LAA; 110, and the second network node AP; 122 and the second wireless device 124 are operating in the second wireless communications network W-Fi; 120.

In FIG. 2 the first and second network nodes 112,122 are schematically illustrated as being located at a distance from each other. However, it should be understood that the first and second network nodes 112,122 may be collocated, e.g. located in close proximity with each other or even within one and the same network node. In such embodiments, it should be understood that a reference to a transmission between the first network node 112 and the second network node 122 may refer to a transmission between different parts, units, modules or circuits of the same network node. Further, it should be understood that one or more of the Actions below may be optional and that actions may be combined. Further, one or more of the Actions below may be performed in another suitable order.

Action 201

An unallocated frequency band available beside a first frequency band intended/allocated for a first (LAA) OFDMA transmission in the shared radio channel is determined. The determination may be performed by the first network node 112 in order to determine whether or not an unallocated frequency band is available beside the first frequency band intended or allocated for a transmission by the first network node 112. If such an unallocated frequency band is determined to exist it may be used by the second network node 122 for a transmission by the second network node 122.

If the first network node 112 and the second network node 122 are collocated, e.g. comprised within the same node, the unallocated frequency band available beside the first frequency band will be known by the first network node 112.

If the first network node 112 and the second network node 122 are not collocated, e.g. they are two separately located devices, the unallocated frequency band available beside the first frequency band may be known either through communication or through sensing of the shared radio channel.

This relates to Action 301 which will be described in more detail below.

Action 202

A sharing request comprising information about the unallocated frequency band is sent. In some embodiments, the sharing request is sent from the first network node 112 to the second network node 122. Thereby the second network node 122 will receive information about the unallocated frequency band.

In some embodiments, the sharing request comprises information about a subframe boundary indicating the start point of time of the first (LAA) OFDMA transmission. The sharing request may comprise information relating to available resources and time of LAA slot boundary, if needed.

This relates to Actions 302 and 501 which will be described below.

Action 203

The system decides to use the unallocated band in a second frequency band in the shared radio channel. This may be performed by the second network node 122. Thus, the second network node 122 may decide to use the unallocated band for transmission. For example, this may be the case when the second network node 122 has no other channels it may use and it have data to transmit. In such scenarios, it may be beneficial to use this unallocated frequency band instead of waiting for the LAA transmission to finish.

This relates to Action 502 which will be described below.

Action 204

In some embodiments, a sharing reply comprising information about the L (legacy) preamble may be sent. The sharing reply may be sent from the second network node 122 to the first network node 112 in response to sharing request. Thereby, the first network node 112 will receive knowledge about the L (legacy) preamble to be transmitted by the first network node 112 according to some embodiments described herein.

This relates to Action 503 which will be described below.

Action 205

The system may provide a guard band between the first frequency band and the second frequency band in the shared radio channel. The guard band is thus optional and sometimes in this disclosure it is referred to as an optional guard band. The guard band may be provided since the first and second wireless communications networks 110,120 are not sharing the same OFDM parameters. Thereby, interference between the first and second OFDMA transmissions may be reduced or even eliminated. In some embodiments, the guard band is provided by the first network node 112. For example, the first network node 112 may determine size and position of the second frequency band, and thereby the first network node 112 may leave the guard band between the first and second frequency bands. The size of the guard band may for example be 2 MHz.

In some embodiments, the guard band size is for example a multiple of a subcarrier spacing in the first (LAA) or second (Wi-Fi) OFDMA transmission.

The shared radio channel may comprise the first frequency band, the optional guard band and the second frequency band. Further, the first frequency band, the optional guard band and the second frequency band may be non-overlapping frequency bands.

It should be understood that the first and second frequency bands may be overlapping frequency bands. This may be the case in some embodiments lacking a guard band.

This relates to Action 303 which will be described below.

Action 206,206'

A contention procedure, such as an LBT procedure, is performed. In Action 206, the contention procedure is performed by the first network node 112. Alternatively or additionally, in Action 206', the second network node 122 may conduct a contention procedure. In some embodiments, when the first and second network nodes 112,122 are not collocated, e.g. when they are located at a distance from each other as illustrated in FIG. 10, both the first and the second network node 112,122 conduct the contention procedure to determine whether the radio channel is busy or available to access.

This relates to Actions 305 and 504 which will be described below.

Action 207,207'

An L (legacy) preamble spanning the shared radio channel is sent. In Action 207, the L preamble is sent from the first network node 112 to the first wireless device 114.

The transmission of the L (legacy) preamble will in some embodiments be detected by the second network node 122. In such embodiments, the detection of the L (legacy) preamble will trigger the second network node 122 to transmit a HE preamble or parts thereof and the second (Wi-Fi) OFDMA transmission. This will be described in for example Actions 208' and 210 below.

Additionally or alternatively, in Action 207', the L preamble is sent from the second network node 122 to the second wireless device 124.

FIGS. 8 and 9 schematically illustrate embodiments of the wireless communications system 100 wherein the first and second network nodes 112,122 are collocated, and FIG. 10 schematically illustrates an embodiment of the wireless communications system 100 wherein the first and second network nodes 112,122 are non-collocated. As illustrated in the FIGS. 8 and 9, when the first and second network nodes 112,122 are collocated, only the first network node 112 or the second network node 122 transmits the L preamble. As illustrated in FIG. 10, the L preamble is transmitted by both the first network node 112 and the second network node 122 when they are being non-collocated, e.g. spaced apart from each other.

This relates to Actions 306 and 505 which will be described below.

Action 208,208'

A first part of a HE (Wi-Fi) preamble spanning the shared radio channel is sent. The first part of the HE (Wi-Fi) preamble may be transmitted from the first network node 112 to the first wireless device 114 (Action 208) or from the second network node 122 the second wireless device 124 (Action 208').

By transmitting the first part of the HE (Wi-Fi) preamble, the first or the second wireless device 114, 124 will be able to synchronize to the transmitter of the first part of the HE (Wi-Fi) preamble e.g. the first or second network node 112,122.

In some first embodiments, when the first and second network nodes 112,122 are collocated at the same location, as illustrated in FIG. 8, the L (legacy) preamble is transmitted by the first network node 112 as described in Action 207 above, and the first part of the HE (Wi-Fi) preamble is transmitted by the first network node 112.

In some second embodiments, when the first and second network nodes 112,122 are collocated at the same location, as illustrated in FIG. 9, both the L (legacy) preamble and the first part of the HE (Wi-Fi) preamble are transmitted by the second network node 122.

In some third embodiments, when the first and second network nodes 112,122 are arranged at different locations, as illustrated in FIG. 10, the sending (Actions 207,207') of the L (legacy) preamble is performed simultaneously by the first and second network nodes 112,122. Further, the sending (Action 208') of the first part of the HE (Wi-Fi) preamble is performed by the second network node 122. The reason for this is that the second wireless device 124 should be synchronized to the second network node 122 in order to be able to receive the OFDMA transmission. As illustrated in FIG. 10, in some third embodiments, the second network node 122 sends the HE preamble, and thus it sends both the first and the second part of the HE preamble. Further, in some third embodiments, synchronization to a subframe boundary of the first network node 112 should be performed in order to obtain alignment of the first (LAA) and second (Wi-Fi) OFDMA transmissions.

This relates to Actions 307 and 506 which will be described below.

Action 209

A first (LAA) OFDMA transmission is sent in the first frequency band such that an end point of time of the first part of the HE (Wi-Fi) preamble coincides with a start point of time of the first OFDMA transmission.

The first (LAA) transmission may be sent from the first network node 112 to the first wireless device 114.

This relates to Action 308 which will be described in more detail below.

Action 210

A second part of the HE (Wi-Fi) preamble and the second (Wi-Fi) OFDMA transmission are sent in the second frequency band.

The second part of the HE (Wi-Fi) preamble and the second (Wi-Fi) OFDMA transmission may be sent from the second network node 122 to the second wireless device 124.

In some embodiments, the L (legacy) preamble sent in Action 207 above is detected, e.g. by the second network node 122, and the sending of the second part of the HE (Wi-Fi) preamble and the second (Wi-Fi) OFDMA transmission in the second frequency band is performed by sending the second part of the HE (Wi-Fi) preamble and the second (Wi-Fi) OFDMA transmission such that an end point of time of the L (legacy) preamble coincides with a start point of time of the second part of the HE (Wi-Fi) preamble and such that an end point of time of the second part of the HE (Wi-Fi) preamble coincides with a start point of time of the second (Wi-Fi) OFDMA transmission.

This relates to Action 507 which will be described below.

Figure 3:
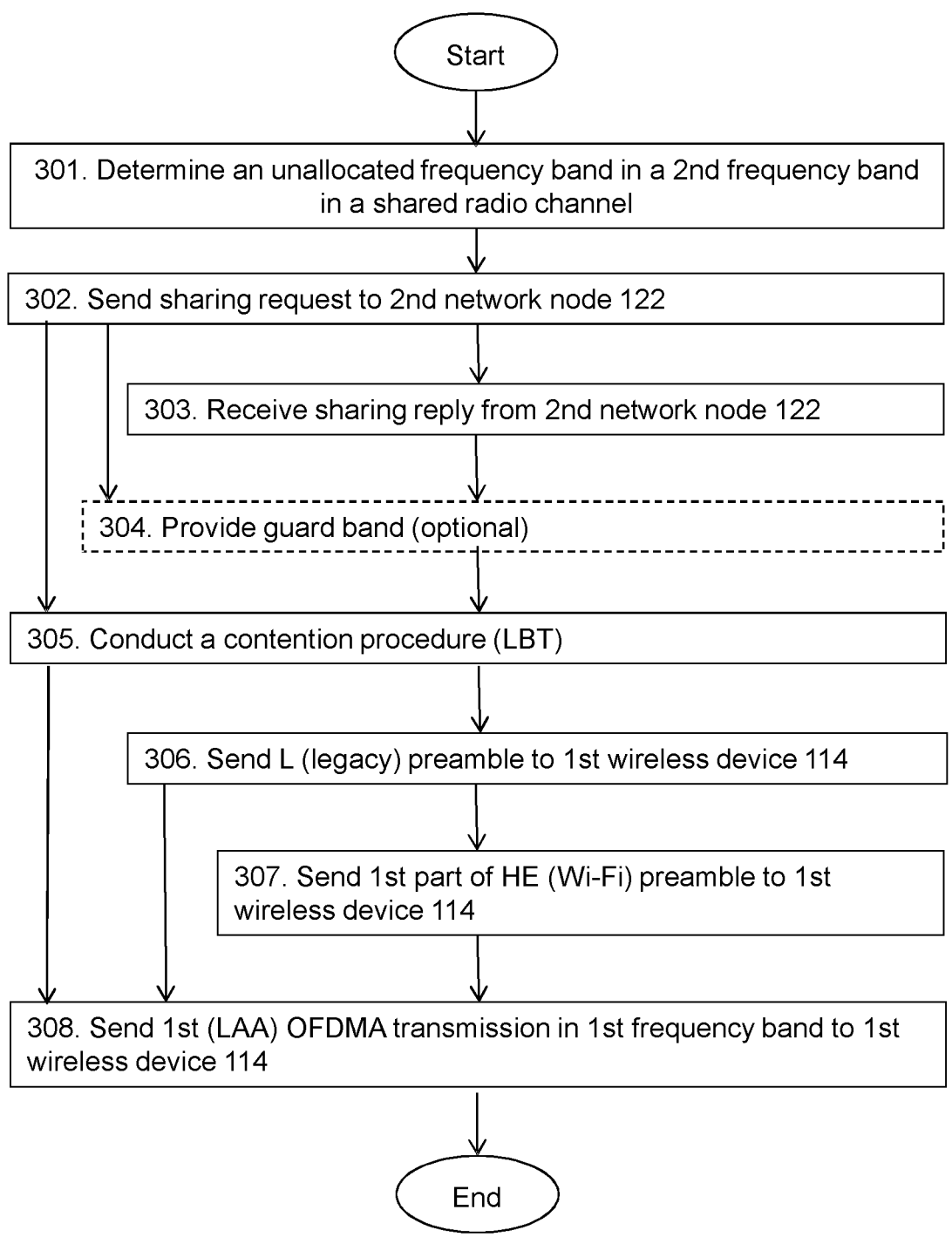
FIG. 3 is a flowchart depicting embodiments of a method performed by a first network node.

Examples of methods performed by the first network node 112 for frequency multiplexing a first (LAA) OFDMA transmission and a second (Wi-Fi) OFDMA transmission on a shared radio channel spanning at least partly a common bandwidth, will now be described with reference to the flowchart depicted in FIG. 3. As previously mentioned, the first network node eNB; 112 and the first wireless device 114 are operating in the first wireless communications network LAA; 110, and the second network node AP; 122 and the second wireless device 124 are operating in the second wireless communications network Wi-Fi; 120.

The methods comprise one or more of the following actions. It should be understood that these actions may be taken in any suitable order and that some actions may be combined.

Action 301

The first network node 112 determines an unallocated frequency band available beside a first frequency band intended/allocated for the first (LAA) OFDMA transmission in the shared radio channel. As will be described below, the unallocated frequency band or parts thereof may be used for the second (Wi-Fi) OFDMA transmission.

This relates to Action 201 previously described.

Action 302

The first network node 112 sends, to the second network node 122, a sharing request comprising information about the unallocated frequency band in a second frequency band in the shared radio channel. Thereby, the second network node 122 will receive knowledge about the unallocated frequency band and may determine to use it or a part thereof for the second (Wi-Fi) OFDMA transmission.

In some embodiments, the sharing request comprises information about a subframe boundary indicating the start point of time of the first (LAA) OFDMA transmission.

This relates to Action 202 previously described.

Action 303

In some embodiments, the first network node 112 receives, from the second network node 122, a sharing reply comprising information about the L (legacy) preamble.

Action 304

The first network node 112 may provide a guard band between the first frequency band and the second frequency band in the shared radio channel. Thus, the guard band may be optional.

In some embodiments, the guard band size is for example a multiple of a subcarrier spacing in the first (LAA) or second (Wi-Fi) OFDM transmission.

The shared radio channel may comprise the first frequency band, the optional guard band and the second frequency band. Further, the first frequency band, the optional guard band and the second frequency band may be non-overlapping frequency bands. However, as previously mentioned, the first and second frequency bands may be overlapping frequency bands. This may be the case in some embodiments lacking a guard band.

This relates to Action 205 previously described.

Action 305

The first network node 112 conducts a contention procedure, such as an LBT procedure.

This relates to Action 206 previously described.

Action 306

In some embodiments, such as in some first and second embodiments, wherein the first and second network nodes 112,122 are collocated at the same location, the first network node 112 sends, to the first wireless device 114, an L (legacy) preamble spanning the shared radio channel.

This relates to Action 207 previously described.

Action 307

In some embodiments, such as in some first and second embodiments, wherein the first and second network nodes 112,122 are collocated at the same location, the first network node 112 sends, to the first wireless device (114), a first part of a HE (Wi-Fi) preamble spanning the shared radio channel.

This relates to Action 208 previously described.

Action 308

The first network node 112 sends, to the first wireless device 114, the first (LAA) OFDMA transmission in the first frequency band, such that an end point of time of the first part of the HE (Wi-Fi) preamble coincides with a start point of time of the first OFDMA transmission.

This relates to Action 209 previously described.

Figure 4:
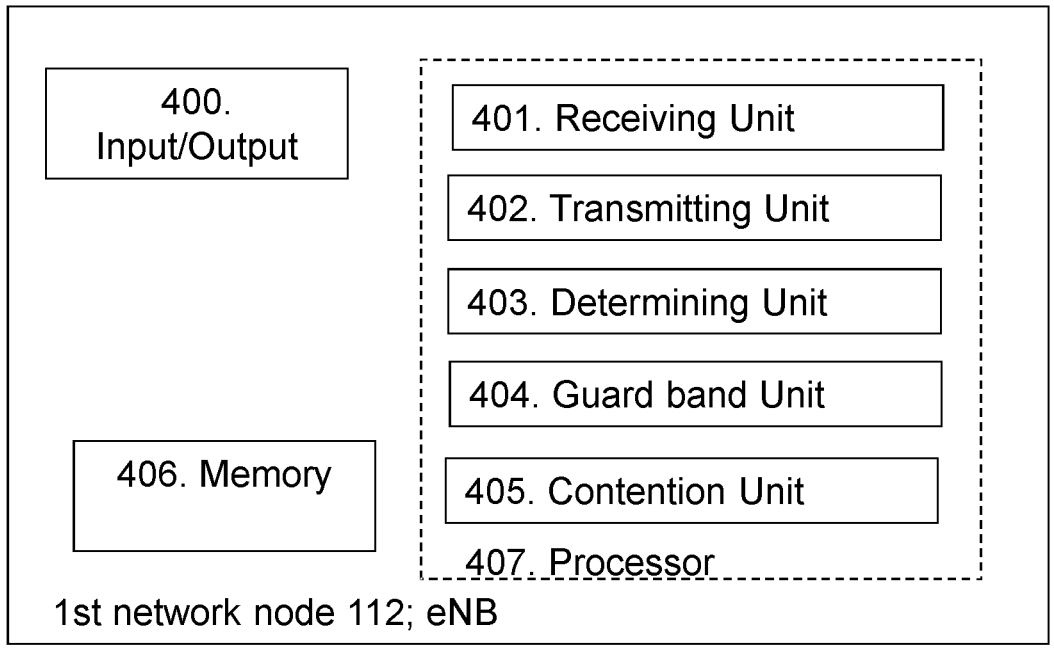
FIG. 4 is a schematic block diagram illustrating embodiments of a first network node.

To perform the method for frequency multiplexing a first (LAA) OFDMA transmission and a second (Wi-Fi) OFDMA transmission on a shared radio channel spanning at least partly a common bandwidth, the first network node 112 may be configured according to an arrangement depicted in FIG. 4. As previously mentioned, the first network node eNB; 112 and the first wireless device 114 are operating in the first wireless communications network LAA; 110, and the second network node AP; 122 and the second wireless device 124 are operating in the second wireless communications network Wi-Fi; 120. As also previously mentioned, the first network node 112 may be a base station supporting LAA and the second network node 122 may be an AP supporting access according to the IEEE 802.11ax standard.

The first network node 112 comprises an input and output interface 400 configured to communicate with one or more other network nodes, e.g. the second network node 122, and/or with one or more wireless devices, e.g. the first wireless device 114. The input and output interface 400 may comprise a wireless receiver (not shown) and a wireless transmitter (not shown).

The first network node 112 is configured to receive, e.g. by means of a receiving unit 401 configured to receive, a transmission from one or more other network nodes, e.g. the second network node 122, and/or from one or more wireless devices, e.g. the first wireless device 114. The receiving unit 401 may be implemented by or arranged in communication with a processor 407 of the first network node 112. The processor 407 will be described in more detail below.

In some embodiments, the first network node 112 is configured to receive, from the second network node 122, a sharing reply comprising information about the L (legacy) preamble.

The first network node 112 is configured to transmit, e.g. by means of a transmitting unit 402 configured to transmit, a transmission to one or more other network nodes, e.g. the second network node 122, and/or to one or more wireless devices, e.g. the first wireless device 114. The transmitting unit 402 may be implemented by or arranged in communication with the processor 407 of the first network node 112.

The first network node 112 is configured to send, to the second network node 122, a sharing request comprising information about the unallocated frequency band in a second frequency band in the shared radio channel.

As previously mentioned, the sharing request may comprise information about a subframe boundary indicating the start point of time of the first (LAA) OFDMA transmission.

The first network node 112 is configured to send, to the first wireless device 114, the first LAA OFDMA transmission in the first frequency band, such that an end point of time of the first part of the HE (Wi-Fi) preamble coincides with a start point of time of the first OFDMA transmission.

The first network node 112 may be configured to determine, e.g. by means of a determining unit 403 configured to determine, as a frequency band, e.g. an unallocated frequency band. The determining unit 403 may be implemented by or arranged in communication with the processor 407 of the first network node 112.

The first network node 112 is configured to determine an unallocated frequency band available beside a first frequency band intended/allocated for a first (LAA) OFDMA transmission in the shared radio channel.

The first network node 112 may be configured to provide, e.g. by means of a guard band unit 404 configured to provide, a guard band. The guard band unit 404 may be implemented by or arranged in communication with the processor 407 of the first network node 112.

The first network node 112 may be configured to provide the guard band between the first frequency band and the second frequency band in the shared radio channel.

As previously mentioned, the guard band may be for example a multiple of a subcarrier spacing in the first (LAA) or second (Wi-Fi) OFDMA transmission.

Further, as also previously mentioned, the shared radio channel may comprise the first frequency band, the optional guard band and the second frequency band. Furthermore, the first frequency band, the optional guard band and the second frequency band may be non-overlapping frequency bands. However, it should be understood that the first and second frequency bands may be overlapping frequency bands. This may be the case in some embodiments lacking a guard band.

The first network node 112 may be configured to conduct, e.g. by means of a contention unit 405 configured to conduct, a contention procedure. The contention unit 405 may be implemented by or arranged in communication with the processor 407 of the first network node 112.

The first network node 112 is configured to conduct a contention procedure, such as an LBT procedure.

The first network node 112 may also comprise means for storing data, e.g. to buffer data to be transmitted. In some embodiments, the first network node 112 comprises a memory 406 configured to store the data. The data may be processed or non-processed data and/or information relating thereto. The memory 406 may comprise one or more memory units. Further, the memory 406 may be a computer data storage or a semiconductor memory such as a computer memory, a read-only memory, a volatile memory or a non-volatile memory. The memory is arranged to be used to store obtained information, data, configurations, scheduling algorithms, and applications etc. to perform the methods herein when being executed in the first network node 112.

Embodiments herein for frequency multiplexing the first (LAA) OFDMA transmission and the second (Wi-Fi) OFDMA transmission on a shared radio channel spanning at least partly a common bandwidth may be implemented through one or more processors, such as the processor 407 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the first network node 112. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first network node 112.

Those skilled in the art will also appreciate that the input/output interface 400, the receiving unit 401, the transmitting unit 402, the determining unit 403, the guard band unit 404, and the contention module 405 above may refer to a combination of analog and digital circuits, and/or one or more processors configured with software and/or firmware, e.g. stored in the memory 406, that when executed by the one or more processors such as the processor in the first network node 112 perform as described in this disclosure. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 5:
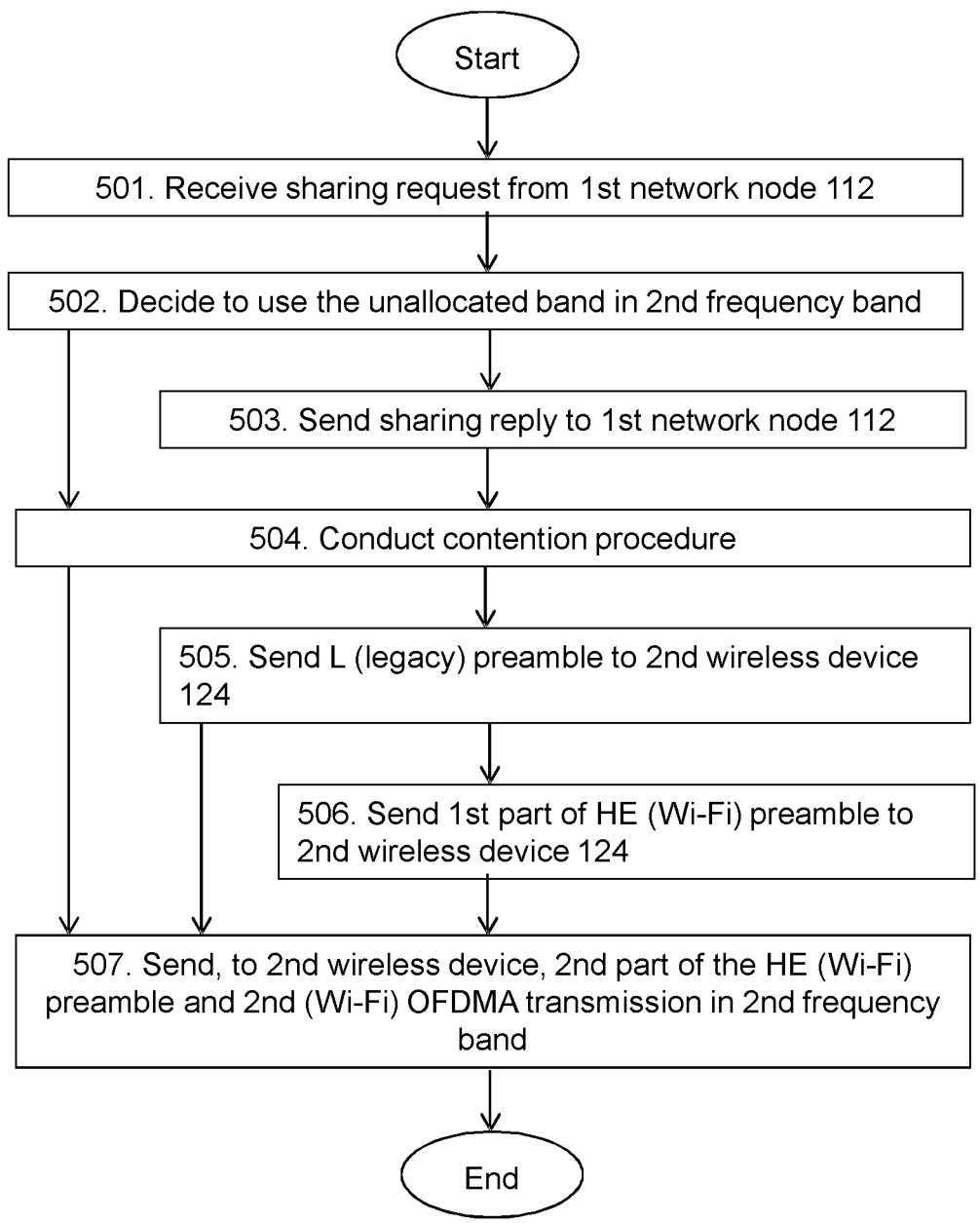
FIG. 5 is a flowchart depicting embodiments of a method performed by a second network node.

Examples of methods performed by the second network node 122 for frequency multiplexing a first (LAA) OFDMA transmission and a second (Wi-Fi) OFDMA transmission on a shared radio channel spanning at least partly a common bandwidth, will now be described with reference to the flowchart depicted in FIG. 5. As previously mentioned, the first network node eNB; 112 and the first wireless device 114 are operating in the first wireless communications network LAA; 110, and the second network node AP; 122 and the second wireless device 124 are operating in the second wireless communications network W-Fi; 120.

The methods comprise one or more of the following actions. It should be understood that these actions may be taken in any suitable order and that some actions may be combined.

Action 501

The second network node 122 receives, from the first network node 112, a sharing request comprising information about an unallocated frequency band available beside a first frequency band intended/allocated for a first (LAA) OFDMA transmission in the shared radio channel.

As previously mentioned, the sharing request may comprise information about a subframe boundary indicating the start point of time of the first (LAA) OFDMA transmission.

As previously mentioned, the shared radio channel may comprise a first frequency band, an optional guard band and the second frequency band. Further, the first frequency band, the optional guard band and the second frequency band may be non-overlapping frequency bands.

This relates to Action 202 previously described.

Action 502

The second network node 122 decides to use the unallocated band in a second frequency band in the shared radio channel.

This relates to Action 203 previously described.

Action 503

In some embodiments, the second network node 122 sends, to the first network node 112, a sharing reply comprising information about an L (legacy) preamble.

This relates to Action 204 previously described.

Action 504

The second network node 122 conducts a contention procedure, such as an LBT procedure.

This relates to Action 206' previously described.

Action 505

In some embodiments, such as in some second embodiments as illustrated in FIG. 9, wherein the first and second network nodes 112,122 are collocated at the same location, the second network node 122 sends, to the second wireless device 124, an L (legacy) preamble spanning the shared radio channel.

The second network node 122 may send the L (legacy) preamble simultaneously with a sending of the L (legacy) preamble by the first network node 112. Further, the second network node 122 may perform synchronization to a subframe boundary of the first network node 112.

This relates to Action 207' previously described.

Action 506

In some embodiments, such as in some second embodiments as illustrated in FIG. 9, wherein the first and second network nodes 112,122 are collocated at the same location, the second network node 122 sends, to the second wireless device 124, a first part of the HE (Wi-Fi) preamble spanning the shared radio channel. As illustrated in FIG. 9, the second network node 122 sends a HE preamble to the second wireless device 124 and thus it sends both the first and second part of the HE preamble. The transmission of the second part of the HE preamble is described in Action 507 below.

This relates to Action 208' previously described.

Action 507

The second network node 122 sends, to the second wireless device 124, a second part of the HE (Wi-Fi) preamble and the second (Wi-Fi) OFDMA transmission in the second frequency band.

In some embodiments, such as in some first embodiments wherein the first and second network nodes 112,122 are collocated as illustrated in FIG. 8, the second network node 122 detects a sent L (legacy) preamble spanning the shared radio channel. Further, in such embodiments, the second network node 122 sends the second part of the HE (Wi-Fi) preamble and the second (Wi-Fi) OFDMA transmission such that an end point of time of the detected L (legacy) preamble coincides with a start point of time of the second part of the HE (Wi-Fi) preamble and such that an end point of time of the second part of the HE (Wi-Fi) preamble coincides with a start point of time of the second (Wi-Fi) OFDMA transmission.

This relates to Action 210 previously described.

Figure 6:
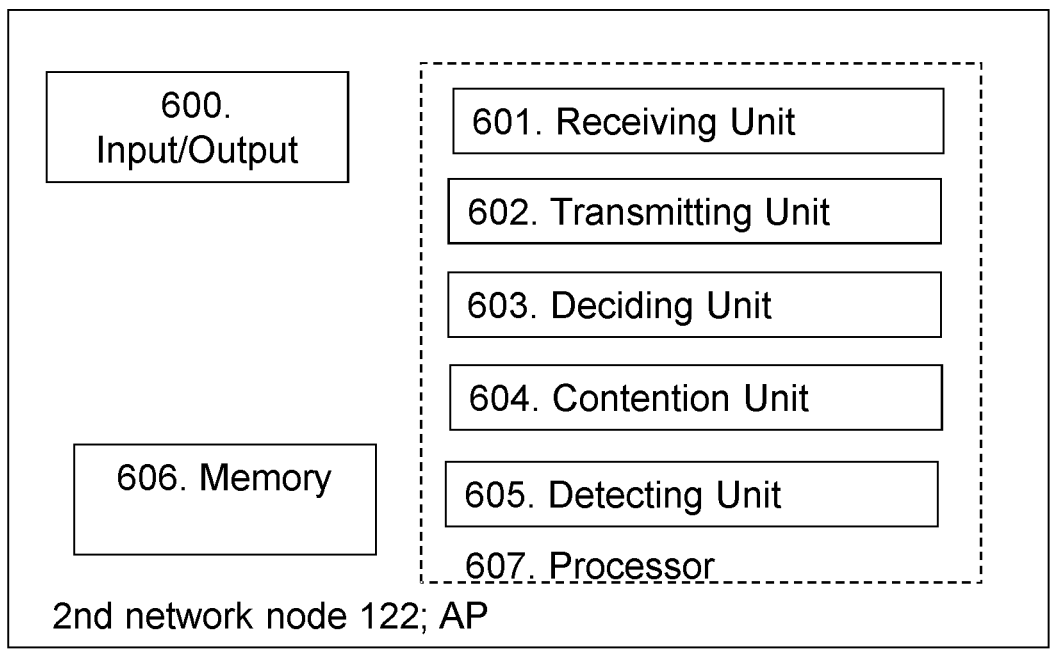
FIG. 6 is a schematic block diagram illustrating embodiments of a second network node.

To perform the method for frequency multiplexing a first (LAA) OFDMA transmission and a second (Wi-Fi) OFDMA transmission on a shared radio channel spanning at least partly a common bandwidth, the second network node 122 may be configured according to an arrangement depicted in FIG. 6. As previously mentioned, the first network node eNB; 112 and the first wireless device 114 are configured to operate in the first wireless communications network LAA; 110, and the second network node AP; 122 and the second wireless device 124 are configured to operate in the second wireless communications network W-Fi; 120.

As also previously mentioned, the first network node 112 may be a base station supporting LAA and the second network node 122 may be an AP supporting access according to the IEEE 802.11ax standard.

The second network node 122 comprises an input and output interface 600 configured to communicate with one or more other network nodes, e.g. the first network node 112, and/or with one or more wireless devices, e.g. the second wireless device 124. The input and output interface 600 may comprise a wireless receiver (not shown) and a wireless transmitter (not shown).

The second network node 122 is configured to receive, e.g. by means of a receiving unit 601 configured to receive, a transmission from one or more other network nodes, e.g. the first network node 112, and/or from one or more wireless devices, e.g. the second wireless device 124. The receiving unit 601 may be implemented by or arranged in communication with a processor 607 of the second network node 122. The processor 607 will be described in more detail below.

The second network node AP; 122 is configured to receive, from the first network node 112, a sharing request comprising information about an unallocated frequency band available beside a first frequency band intended/allocated for a first (LAA) OFDMA transmission in the shared radio channel.

As previously mentioned, the sharing request may comprise information about a subframe boundary indicating the start point of time of the first (LAA) OFDMA transmission.

As also previously mentioned, the shared radio channel may comprise a first frequency band, an optional guard band and the second frequency band. Further, the first frequency band, the optional guard band and the second frequency band may be non-overlapping frequency bands.

The second network node 122 is configured to transmit, e.g. by means of a transmitting unit 602 configured to transmit, a transmission to one or more other network nodes, e.g. the first network node 112, and/or to one or more wireless devices, e.g. the second wireless device 124. The transmitting unit 602 may be implemented by or arranged in communication with the processor 607 of the second network node 122.

The second network node 122 is configured to send, to the second wireless device 124, a second part of the HE (Wi-Fi) preamble and the second (Wi-Fi) OFDMA transmission in the second frequency band.

In some embodiments, the second network node 122 is configured to send, to the first network node 112, a sharing reply comprising information about an L (legacy) preamble.

In some embodiments, such as in some first embodiments illustrated in FIG. 8, wherein the second network node 122 is configured to detect a sent L (legacy) preamble spanning the shared radio channel, the second network node AP; 122 is configured to send the second part of the HE (Wi-Fi) preamble and the second (Wi-Fi) OFDMA transmission in the second frequency band by being configured to send the second part of the HE (Wi-Fi) preamble and the second (Wi-Fi) OFDMA transmission such that an end point of time of the detected L (legacy) preamble coincides with a start point of time of the second part of the HE (Wi-Fi) preamble and such that an end point of time of the second part of the HE (Wi-Fi) preamble coincides with a start point of time of the second (Wi-Fi) OFDMA transmission.

In some embodiments, such as in some second embodiments, when the first and second network nodes 112,122 are collocated at the same location as illustrated in FIG. 9, the second network node AP; 122 is configured to send, to the second wireless device 124, an L (legacy) preamble spanning the shared radio channel. Further, the second network node 122 is configured to send, to the second wireless device 124, a first part of the HE (Wi-Fi) preamble spanning the shared radio channel.

In some embodiments, such as in some second and some third embodiments, when the first and second network nodes 112,122 are not collocated at the same location as illustrated in FIG. 10, the second network node AP; 122 is configured to send the L (legacy) preamble simultaneously with a sending of the L (legacy) preamble by the first network node 112 and to perform synchronization to a subframe boundary of the first network node 112.

The second network node 122 may be configured to decide, e.g. by means of a deciding unit 603 configured to decide, to use a frequency band. The deciding unit 603 may be implemented by or arranged in communication with the processor 607 of the second network node 122.

The second network node 122 is configured to decide to use the unallocated band in a second frequency band in the shared radio channel.

The second network node 122 may be configured to conduct, e.g. by means of a contention unit 604 configured to conduct, a contention procedure. The contention unit 604 may be implemented by or arranged in communication with the processor 607 of the second network node 122.

The second network node 122 is configured to conduct a contention procedure, such as an LBT procedure.

The second network node 122 may be configured to detect, e.g. by means of a detecting unit 605 configured to detect, a transmission. The detecting unit 605 may be implemented by or arranged in communication with the processor 607 of the second network node 122.

In some embodiments, such as in some first embodiments illustrated in FIG. 8, the second network node 122 is configured to detect a sent L (legacy) preamble spanning the shared radio channel.

The second network node 122 may also comprise means for storing data, e.g. to buffer data to be transmitted. In some embodiments, the second network node 122 comprises a memory 606 configured to store the data. The data may be processed or non-processed data and/or information relating thereto. The memory 606 may comprise one or more memory units. Further, the memory 606 may be a computer data storage or a semiconductor memory such as a computer memory, a read-only memory, a volatile memory or a non-volatile memory. The memory is arranged to be used to store obtained information, data, configurations, scheduling algorithms, and applications etc. to perform the methods herein when being executed in the second network node 122.

Embodiments herein for frequency multiplexing the first (LAA) OFDMA transmission and the second (Wi-Fi) OFDMA transmission on a shared radio channel spanning at least partly a common bandwidth may be implemented through one or more processors, such as the processor 607 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the second network node 122. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the second network node 122.

Those skilled in the art will also appreciate that the input/output interface 600, the receiving unit 601, the transmitting unit 602, the deciding unit 603, the contention unit 604, and the detecting unit 605 above may refer to a combination of analog and digital circuits, and/or one or more processors configured with software and/or firmware, e.g. stored in the memory 606, that when executed by the one or more processors such as the processor in the second network node 122 perform as described in this disclosure. One or more of these processors, as well as the other digital hardware, may be included in a single ASIC, or several processors and various digital hardware may be distributed among several separate components, whether individually packaged or assembled into a SoC.

When using the word "comprise" or "comprising" it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed in a wireless communications system for frequency multiplexing a first Orthogonal Frequency Division Multiple Access (OFDMA) transmission and a second OFDMA transmission on a shared radio channel spanning at least partly a common bandwidth, wherein a first network node and a first wireless device are operating in a first wireless communications network, and a second network node and a second wireless device are operating in a second wireless communications network, and wherein the method comprises:
   determining an unallocated frequency band available beside a first frequency band intended/allocated for a first OFDMA transmission in the shared radio channel;
   sending a sharing request comprising information about the unallocated frequency band;
   deciding to use the unallocated band in a second frequency band in the shared radio channel;
   conducting a contention procedure;
   sending a legacy (L) preamble spanning the shared radio channel;
   sending a first part of a High Efficiency (HE) preamble spanning the shared radio channel;
   sending a first OFDMA transmission in the first frequency band, such that an end point of time of the first part of the HE preamble coincides with a start point of time of the first OFDMA transmission; and
   sending a second part of the HE preamble and the second OFDMA transmission in the second frequency band.

2. The method according to claim 1, wherein the method comprises:
   detecting the sent L preamble, and wherein the sending of the second part of the HE preamble and the second OFDMA transmission in the second frequency band comprises:
   sending the second part of the HE preamble and the second OFDMA transmission such that an end point of time of the L preamble coincides with a start point of time of the second part of the HE preamble and such that an end point of time of the second part of the HE preamble coincides with a start point of time of the second OFDMA transmission.

3. The method according to claim 1, wherein the sharing request comprises information about a subframe boundary indicating the start point of time of the first OFDMA transmission.

4. The method according to claim 1, wherein the method comprises:
   providing a guard band between the first frequency band and the second frequency band in the shared radio channel, and wherein the guard band size for example is a multiple of a subcarrier spacing in the first or second OFDMA transmission.

5. The method according to claim 1, wherein the shared radio channel comprises the first frequency band, an optional guard band and the second frequency band, and wherein the first frequency band, the optional guard band and the second frequency band are non-overlapping frequency bands.

6. The method according to claim 1, comprising:
   sending a sharing reply comprising information about the L preamble.

7. The method according to claim 1, wherein the sending of the first OFDMA transmission is performed by the first network node, and wherein the sending of the second part of the HE preamble and the second OFDMA transmission are performed by the second network node.

8. The method according to claim 7, wherein the first and second network nodes are collocated at the same location, and wherein the sending of the L preamble, and the sending of the first part of the HE preamble is performed by the first network node.

9. The method according to claim 7, wherein the first and second network nodes are collocated at the same location, wherein the sending of the L preamble and the sending of the first part of the HE preamble are performed by the second network node.

10. The method according to claim 9, wherein the conducting of the contention procedure is performed by the first and second network nodes.

11. The method according to claim 7, wherein the first and second network nodes are arranged at different locations, wherein the sending of the L preamble is performed simultaneously by the first and second network nodes, and wherein the sending of the first part of the HE preamble is performed by the second network node:
   performing synchronization to a subframe boundary of the first network node.

12. A method performed by a first network node for frequency multiplexing a first Orthogonal Frequency Division Multiple Access (OFDMA) transmission and a second OFDMA transmission on a shared radio channel spanning at least partly a common bandwidth, wherein the first network node and a first wireless device are operating in a first wireless communications network, and a second network node and a second wireless device are operating in a second wireless communications network, and wherein the method comprises:
   determining an unallocated frequency band available beside a first frequency band intended/allocated for a first OFDMA transmission in the shared radio channel;

sending, to the second network node, a sharing request comprising information about the unallocated frequency band in a second frequency band in the shared radio channel;
conducting a contention procedure;
sending, to the first wireless device, the first OFDMA transmission in the first frequency band, such that an end point of time of a first part of a High Efficiency (HE) preamble coincides with a start point of time of the first OFDMA transmission.

13. The method according to claim 12, wherein the sharing request comprises information about a subframe boundary indicating the start point of time of the first OFDMA transmission.

14. The method according to claim 12, wherein the method comprises:
providing a guard band between the first frequency band and the second frequency band in the shared radio channel, and wherein the guard band size is for example a multiple of a subcarrier spacing in the first or second OFDM transmission.

15. The method according to claim 12, wherein the shared radio channel comprises the first frequency band, an optional guard band and the second frequency band, and wherein the first frequency band, the optional guard band and the second frequency band are non-overlapping frequency bands.

16. The method according to claim 12, comprising:
receiving, from the second network node, a sharing reply comprising information about a Legacy (L) preamble.

17. The method according to claim 12, wherein the first and second network nodes are collocated at the same location, and wherein the method comprises:
sending, to the first wireless device, a Legacy (L) preamble spanning the shared radio channel;
sending, to the first wireless device, the first part of the HE preamble spanning the shared radio channel.

18. A method performed by a second network node for frequency multiplexing a first Orthogonal Frequency Division Multiple Access (OFDMA) transmission and a second OFDMA transmission on a shared radio channel spanning at least partly a common bandwidth, wherein a first network node and a first wireless device are operating in a first wireless communications network, and the second network node and a second wireless device are operating in a second wireless communications network, and wherein the method comprises:
receiving, from the first network node, a sharing request comprising information about an unallocated frequency band available beside a first frequency band intended/allocated for a first OFDMA transmission in the shared radio channel;
deciding to use the unallocated band in a second frequency band in the shared radio channel;
conducting a contention procedure; and
sending, to the second wireless device, a second part of a High Efficiency (HE) preamble and the second OFDMA transmission in the second frequency band.

19. The method according to claim 18, comprising:
sending, to the first network node, a sharing reply comprising information about an L preamble.

20. The method according to claim 18, wherein the method comprises:
detecting a sent Legacy (L) preamble spanning the shared radio channel, and wherein the sending of the second part of the HE preamble and the second OFDMA transmission in the second frequency band comprises:
sending the second part of the HE preamble and the second OFDMA transmission such that an end point of time of the detected L preamble coincides with a start point of time of the second part of the HE preamble and such that an end point of time of the second part of the HE preamble coincides with a start point of time of the second OFDMA transmission.

21. The method according to claim 18, wherein the sharing request comprises information about a subframe boundary indicating the start point of time of the first OFDMA transmission.

22. The method according to claim 18, wherein the shared radio channel comprises a first frequency band, a optional guard band and the second frequency band, and wherein the first frequency band, the optional guard band and the second frequency band are non-overlapping frequency bands.

23. The method according to claim 18, wherein the first and second network nodes are collocated at the same location, wherein the method comprises:
sending, to the second wireless device, a Legacy (L) preamble spanning the shared radio channel; and
sending, to the second wireless device, a first part of the HE preamble spanning the shared radio channel.

24. The method according to claim 18, wherein the sending of a Legacy (L) preamble is performed simultaneously with a sending of the L preamble by the first network node and wherein the method comprises:
performing synchronization to a subframe boundary of the first network node.

25. A wireless communications system for frequency multiplexing a first Orthogonal Frequency Division Multiple Access (OFDMA) transmission and a second OFDMA transmission on a shared radio channel spanning at least partly a common bandwidth, wherein a first network node and a first wireless device are configured to operate in a first wireless communications network, and a second network node and a second wireless device are configured to operate in a second wireless communications network, and wherein the wireless communications system is configured to:
determine an unallocated frequency band available beside a first frequency band intended/allocated for a first OFDMA transmission in the shared radio channel;
send a sharing request comprising information about the unallocated frequency band;
decide to use the unallocated band in a second frequency band in the shared radio channel;
conduct a contention procedure;
send a Legacy (L) preamble spanning the shared radio channel;
send a first part of a High Efficiency (HE) preamble spanning the shared radio channel;
send a first OFDMA transmission in the first frequency band, such that an end point of time of the first part of the HE preamble coincides with a start point of time of the first OFDMA transmission; and
send a second part of the HE preamble and the second OFDMA transmission in the second frequency band.

26. A first network node for frequency multiplexing a first Orthogonal Frequency Division Multiple Access (OFDMA) transmission and a second OFDMA transmission on a shared radio channel spanning at least partly a common bandwidth, wherein the first network node and a first wireless device are configured to operate in a first wireless communications network, and a second network node and a second wireless device are configured to operate in a second wireless communications network, and wherein the first network node is configured to:

determine an unallocated frequency band available beside a first frequency band intended/allocated for a first OFDMA transmission in the shared radio channel;

send, to the second network node, a sharing request comprising information about the unallocated frequency band in a second frequency band in the shared radio channel;

conduct a contention procedure;

send, to the first wireless device, the first OFDMA transmission in the first frequency band, such that an end point of time of the first part of a High Efficiency (HE) preamble coincides with a start point of time of the first OFDMA transmission.

27. The first network node according to claim 26, wherein the sharing request comprises information about a subframe boundary indicating the start point of time of the first OFDMA transmission.

28. The first network node according to claim 26, being configured to:
provide a guard band between the first frequency band and the second frequency band in the shared radio channel, wherein the guard band size for example is a multiple of a subcarrier spacing in the first or second OFDMA transmission.

29. The first network node according to claim 26, wherein the shared radio channel comprises the first frequency band, an optional guard band and the second frequency band, and wherein the first frequency band, the optional guard band and the second frequency band are non-overlapping frequency bands.

30. The first network node according to claim 26, configured to:
receive, from the second network node, a sharing reply comprising information about a Legacy (L) preamble.

31. The first network node according to claim 26, wherein the first and second network nodes are collocated at the same location, and wherein the first network node is configured to:
send, to the first wireless device, a Legacy (L) preamble spanning the shared radio channel; and
send, to the first wireless device, a first part of the HE preamble spanning the shared radio channel.

32. The first network node according to claim 26, wherein the first network node is a base station supporting Licensed-Assisted Access (LAA).

33. A second network node for frequency multiplexing a first Orthogonal Frequency Division Multiple Access (OFDMA) transmission and a second OFDMA transmission on a shared radio channel spanning at least partly a common bandwidth, wherein a first network node and a first wireless device are configured to operate in a first wireless communications network, and the second network node and a second wireless device are configured to operate in a second wireless communications network, and wherein the second network node is configured to:
receive, from the first network node, a sharing request comprising information about an unallocated frequency band available beside a first frequency band intended/allocated for a first OFDMA transmission in the shared radio channel;
decide to use the unallocated band in a second frequency band in the shared radio channel;
conduct a contention procedure; and
send, to the second wireless device, a second part of a High Efficiency (HE) preamble and the second OFDMA transmission in the second frequency band.

34. The second network node according to claim 33, configured to:
send, to the first network node, a sharing reply comprising information about an L preamble.

35. The second network node according to claim 33, configured to:
detect a sent Legacy (L) preamble spanning the shared radio channel, and wherein the second network node is configured to send the second part of the HE preamble and the second OFDMA transmission in the second frequency band by being configured to:
send the second part of the HE preamble and the second OFDMA transmission such that an end point of time of the detected L preamble coincides with a start point of time of the second part of the HE preamble and such that an end point of time of the second part of the HE preamble coincides with a start point of time of the second OFDMA transmission.

36. The second network node according to claim 33, wherein the sharing request comprises information about a subframe boundary indicating the start point of time of the first OFDMA transmission.

37. The second network node according to claim 33, wherein the shared radio channel comprises a first frequency band, an optional guard band and the second frequency band, and wherein the first frequency band, the optional guard band and the second frequency band are non-overlapping frequency bands.

38. The second network node according to claim 33, wherein the first and second network nodes are collocated at the same location, wherein the second network node is configured to:
send, to the second wireless device, a Legacy (L) preamble spanning the shared radio channel; and
send, to the second wireless device, a first part of the HE preamble spanning the shared radio channel.

39. The second network node according to claim 33, wherein the second network node is configured to send a Legacy (L) preamble simultaneously with a sending of the L preamble by the first network node and to perform synchronization to a subframe boundary of the first network node.

40. The second network node according to claim 33, wherein the second network node is an Access Point supporting access according to the IEEE 802.11ax standard.

41. A non-transitory computer readable storage medium comprising instructions which, when executed on at least one processor, causes the at least one processor to carry out a method performed in a wireless communications system for frequency multiplexing a first Orthogonal Frequency Division Multiple Access (OFDMA) transmission and a second OFDMA transmission on a shared radio channel spanning at least partly a common bandwidth, wherein a first network node and a first wireless device are operating in a first wireless communications network, and a second network node and a second wireless device are operating in a second wireless communications network, and wherein the method comprises:
determining an unallocated frequency band available beside a first frequency band intended/allocated for a first OFDMA transmission in the shared radio channel;
sending a sharing request comprising information about the unallocated frequency band;
deciding to use the unallocated band in a second frequency band in the shared radio channel;
conducting a contention procedure;
sending a Legacy (L) preamble spanning the shared radio channel;

sending a first part of a High Efficiency (HE) preamble spanning the shared radio channel;

sending a first OFDMA transmission in the first frequency band, such that an end point of time of the first part of the HE preamble coincides with a start point of time of the first OFDMA transmission; and sending a second part of the HE preamble and the second OFDMA transmission in the second frequency band.

* * * * *